(12) United States Patent
Li et al.

(10) Patent No.: US 9,256,682 B1
(45) Date of Patent: Feb. 9, 2016

(54) PROVIDING SEARCH RESULTS BASED ON SORTED PROPERTIES

(71) Applicant: Google Inc., Mountain View, CA (US)

(72) Inventors: Yiming Li, Shanghai (CN); Zhenyu Gu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 409 days.

(21) Appl. No.: 13/706,187

(22) Filed: Dec. 5, 2012

(51) Int. Cl.
*G06F 17/30* (2006.01)

(52) U.S. Cl.
CPC .... *G06F 17/30864* (2013.01); *G06F 17/30312* (2013.01); *G06F 17/30958* (2013.01)

(58) Field of Classification Search
CPC .............. G06F 17/30312; G06F 17/30958
USPC ................................. 707/706, 769
See application file for complete search history.

(56) References Cited

U.S. PATENT DOCUMENTS

| | | | |
|---|---|---|---|
| 5,666,502 A | 9/1997 | Capps | |
| 5,946,647 A | 8/1999 | Miller et al. | |
| 6,513,036 B2 | 1/2003 | Fruensgaard et al. | |
| 6,832,218 B1 | 12/2004 | Emens et al. | |
| 6,847,959 B1 | 1/2005 | Arrouye et al. | |
| 6,944,612 B2 | 9/2005 | Roustant et al. | |
| 7,502,770 B2 * | 3/2009 | Hillis et al. | 706/45 |
| 7,562,076 B2 | 7/2009 | Kapur | |
| 7,565,139 B2 | 7/2009 | Neven, Sr. et al. | |
| 7,603,374 B2 | 10/2009 | Cameron et al. | |
| 7,720,702 B2 | 5/2010 | Fredericks et al. | |
| 7,761,414 B2 | 7/2010 | Freedman | |
| 7,765,206 B2 | 7/2010 | Hillis et al. | |
| 7,797,336 B2 | 9/2010 | Blair et al. | |
| 7,818,324 B1 | 10/2010 | Held et al. | |
| 7,895,196 B2 | 2/2011 | Mahadevan et al. | |
| 7,933,900 B2 | 4/2011 | Reddy et al. | |
| 7,974,892 B2 | 7/2011 | Fredericks et al. | |
| 8,005,720 B2 | 8/2011 | King et al. | |
| 8,051,104 B2 | 11/2011 | Weissman et al. | |
| 8,069,175 B2 | 11/2011 | Hillis et al. | |

(Continued)

FOREIGN PATENT DOCUMENTS

| | | |
|---|---|---|
| CN | 101341464 A | 1/2009 |
| CN | 102298616 A | 12/2011 |

(Continued)

OTHER PUBLICATIONS

Elliott, Bruce, U.S. Appl. No. 13/606,494, "Systems and Methods for Displaying Schedule Information," Sep. 7, 2012, pp. 1-23.

(Continued)

*Primary Examiner* — Joshua Bullock
(74) *Attorney, Agent, or Firm* — Finnegan, Henderson, Farabow, Garrett & Dunner, L.L.P.

(57) ABSTRACT

An entity may be related to multiple related entities by one or more properties, and the entity may also be associated with one or more entity types. A system for providing sorted results may include identifying the entity, related entities, and types. The system may also determine related entity scores for each respective related entity, relative to the entity. For each property, the related entity scores of the related entities related to the entity by that property are combined to generate a property score. The properties are then sorted based on their property scores. The sorting may occur for properties associated with an entity type, and sorted search results may be provided as output for one or more entity types of interest.

21 Claims, 8 Drawing Sheets

500

| PROPERTY | TYPE: ACTOR | TYPE: DIRECTOR | TYPE: PERSON |
|---|---|---|---|
| NAME | 10.0 | 10.0 | 10.0 |
| BIRTHDATE | 9.0 | 9.0 | 10.0 |
| MOVIES ACTED IN | 9.0 | 7.0 | 1.0 |
| MOVIES DIRECTED | 7.0 | 9.0 | 1.0 |
| ⋮ | ⋮ | ⋮ | ⋮ |
| CHILDREN | 1.0 | 1.0 | 9.0 |

(56) References Cited

U.S. PATENT DOCUMENTS

| | | |
|---|---|---|
| 8,086,604 B2 | 12/2011 | Arrouye et al. |
| 8,140,361 B2 | 3/2012 | Fredericks et al. |
| 8,204,856 B2 | 6/2012 | Meyer et al. |
| 8,286,885 B1 | 10/2012 | Zehr et al. |
| 8,316,029 B2 | 11/2012 | Lawrence |
| 8,429,103 B1 | 4/2013 | Aradhye et al. |
| 2002/0083038 A1 | 6/2002 | Berndt |
| 2002/0083039 A1 | 6/2002 | Ferrari et al. |
| 2004/0093321 A1* | 5/2004 | Roustant et al. ............ 707/3 |
| 2006/0026147 A1 | 2/2006 | Cone et al. |
| 2007/0055947 A1 | 3/2007 | Ostojic et al. |
| 2007/0260594 A1 | 11/2007 | Lewak et al. |
| 2008/0010273 A1 | 1/2008 | Frank |
| 2008/0126143 A1 | 5/2008 | Altman et al. |
| 2009/0012842 A1* | 1/2009 | Srinivasan et al. ........... 705/10 |
| 2009/0058821 A1 | 3/2009 | Chaudhri et al. |
| 2009/0224867 A1 | 9/2009 | O'Shaughnessy et al. |
| 2010/0070448 A1 | 3/2010 | Omoigui |
| 2010/0318537 A1* | 12/2010 | Surendran et al. ............ 707/759 |
| 2011/0040776 A1* | 2/2011 | Najm et al. ............... 707/766 |
| 2011/0137883 A1 | 6/2011 | Lagad et al. |
| 2011/0184981 A1 | 7/2011 | Lu et al. |
| 2011/0202493 A1 | 8/2011 | Li |
| 2011/0258006 A1 | 10/2011 | Koetting et al. |
| 2012/0059745 A1 | 3/2012 | Fredericks et al. |
| 2012/0066627 A1 | 3/2012 | Furukawa et al. |
| 2012/0101858 A1 | 4/2012 | Depasquale et al. |
| 2012/0101901 A1 | 4/2012 | Depasquale et al. |
| 2012/0150572 A1 | 6/2012 | Fredericks et al. |
| 2012/0158633 A1* | 6/2012 | Eder ........................ 706/46 |
| 2012/0158687 A1* | 6/2012 | Fang et al. ................ 707/706 |
| 2012/0158791 A1* | 6/2012 | Kasneci et al. ............. 707/798 |
| 2012/0159340 A1 | 6/2012 | Bae et al. |
| 2012/0246153 A1 | 9/2012 | Pehle |
| 2012/0330906 A1 | 12/2012 | Fredericks et al. |
| 2013/0054542 A1 | 2/2013 | Ollenberger et al. |
| 2013/0110833 A1 | 5/2013 | Fredericks et al. |

FOREIGN PATENT DOCUMENTS

| | | |
|---|---|---|
| JP | 2005165986 A | 6/2005 |
| JP | 2011186876 A | 9/2011 |
| WO | WO 0131479 | 5/2001 |
| WO | WO 2006110480 | 10/2006 |
| WO | WO 2010120925 | 10/2010 |

OTHER PUBLICATIONS

TripIt, "TripIt Simplifies Business Travel and Keeps Travelers Connected on the Road," Concur Technologies Inc., Feb. 4, 2008, available at http://www.tripit.com/press/company-announcements/tripit-simplifies-business-travel-and-keeps-travelers-connected-road, pp. 1-2.

TripIt, "TripIt Brings Travel Itineraries to Mobile Phones," Concur Technologies Inc., Apr. 7, 2008, available at http://www.tripit.com/press/company-announcements/tripit-brings-travel-itineraries-mobile-phones, pp. 1-2.

TripIt, "Announcing TripIt—The First Intelligent Travel Organizer for Do-It-Yourself Trip Planners," Concur Technologies Inc., Sep. 18, 2007, available at http://www.tripit.com/press/company-announcements/announcing-tripit-first-intelligent-travel-organizer-do-it-yourself-trip, pp. 1-2.

Marie-Catherine De Marneffe, Christopher D. Manning, "Stanford Typed Dependencies Manual," Sep. 2011, 24 pages.

Kao, Wayne, "Telling the Story of Friendships," Facebook, Oct. 28, 2010, available at http://blog.facebook.com/blog.php?post=443390892130, pp. 1-2.

Dekang Lin, "Dependency-based Evaluation of MINIPAR," In Workshop on the Evaluation of Parsing Systems, May 1, 1998, 14 pages, Granada, Spain.

Rion Snow, Daniel Jurafsky, Andrew Y. Ng, "Learning Syntactic Patterns for Automatic Hypernym Discovery," 2011, 8 pages.

Veselin Stoyanov, Claire Cardie, Nathan Gilbert, Ellen Riloff, David Buttler, David Hysom, "Reconcile: A Coreference Resolution Research Platform," May 13, 2010, 14 pages.

* cited by examiner

| PROPERTY | TYPE: ACTOR | TYPE: DIRECTOR | TYPE: PERSON |
|---|---|---|---|
| NAME | 10.0 | 10.0 | 10.0 |
| BIRTHDATE | 9.0 | 9.0 | 10.0 |
| MOVIES ACTED IN | 9.0 | 7.0 | 1.0 |
| MOVIES DIRECTED | 7.0 | 9.0 | 1.0 |
| ⋮ | ⋮ | ⋮ | ⋮ |
| CHILDREN | 1.0 | 1.0 | 9.0 |

PROVIDING SEARCH RESULTS BASED ON SORTED PROPERTIES

BACKGROUND

Search engines receive search queries from users and provide search results based on the received search queries. Search engines sometimes provide to a user information in response to a query that may not be exactly what was desired. This can occur in cases where a subject of the query may be viewed from different perspectives. For example, a conventional search engine processes the query "Tom Hanks" without regard to whether the user desires information about movies in which Tom Hanks acted or about movies that Tom Hanks directed.

SUMMARY

In some implementations, a computer-implemented method comprises identifying in a knowledge graph, using at least one processor, at least one entity and related entities related to the at least one entity by respective properties. The computer-implemented method comprises, for each respective one of the related entities, determining, using at least one processor, a related entity score associated with a respective property that relates the at least one entity and the respective one of the related entities. The computer-implemented method comprises, for each respective property, generating a property score, using at least one processor, based on related entity scores associated with that respective property. The computer-implemented method comprises generating, using at least one processor, and causing to be stored a data structure of sortable properties based on the generated property scores, wherein the data structure is usable to provide sorted search results in response to a query.

In some implementations, a system comprises a data structure comprising a knowledge graph, and one or more processors. The one or more processors are configured to perform operations comprising identifying in the knowledge graph at least one entity and related entities related to the at least one entity by respective properties. The one or more processors are configured to perform operations comprising, for each respective one of the related entities, determining a related entity score associated with a respective property that relates the at least one entity and the respective one of the related entities. The one or more processors are configured to perform operations comprising, for each respective property, generating a property score based on related entity scores associated with that respective property. The one or more processors are configured to perform operations comprising generating and causing to be stored a data structure of sortable properties based on the generated property scores, wherein the data structure is usable to provide sorted search results in response to a query.

In some implementations, a non-transitory computer-readable medium for search is provided. The computer-readable medium has computer program instructions recorded thereon for identifying in a knowledge graph, using at least one processor, at least one entity and related entities related to the at least one entity by respective properties. The computer-readable medium has computer program instructions recorded thereon for, for each respective one of the related entities, determining, using at least one processor, a related entity score associated with a respective property that relates the at least one entity and the respective one of the related entities. The computer-readable medium has computer program instructions recorded thereon for, for each respective property, generating a property score, using at least one processor, based on related entity scores associated with that respective property. The computer-readable medium has computer program instructions recorded thereon for generating, using at least one processor, and causing to be stored a data structure of sortable properties based on the generated property scores, wherein the data structure is usable to provide sorted search results in response to a query.

BRIEF DESCRIPTION OF THE FIGURES

The above and other features of the present disclosure, its nature and various advantages will be more apparent upon consideration of the following detailed description, taken in conjunction with the accompanying drawings in which.

DETAILED DESCRIPTION OF THE FIGURES

A particular entity may be associated with several types, and may also be related to multiple other entities by virtue of one or more properties. As used herein, an entity is a thing or concept that is singular, unique, well-defined, and distinguishable. For example, an entity may be a person, place, item, idea, topic, abstract concept, concrete element, other suitable thing, or any combination thereof. In some implementations, search results include results identifying entity references. As used herein, an entity reference is an identifier, e.g., text, or other information that refers to an entity. For example, an entity may be the physical embodiment of George Washington, while an entity reference is an abstract concept that refers to George Washington. Where appropriate, based on context, it will be understood that the term entity as used herein may correspond to an entity reference, and the term entity reference as used herein may correspond to an entity. In some implementations, the search system may identify an entity type associated with an entity reference. The entity type may be a categorization or classification used to identify entity references in the data structure. For example, the entity reference "George Washington" may be associated with the entity types "U. S. President," "Person," and "Military Officer." Properties describe relationships between entities, in other words, how one entity is related to another entity. The most important properties associated with an entity may depend on which of its types are of interest. For example, for entity "Tom Hanks," a user may want search results to include his movies or other information about his acting. However, for entity "Albert Einstein," users may want search results to include his theories, technical papers, and other information related to his contributions in physics. The disclosed techniques may be used to determine the important attributes, and accordingly provide search results that the user likely wants.

In some implementations, a data structure such includes any suitable data structure, data graph, database, index, list, linked list, table, any other suitable information, or any combination thereof. For example, a data structure may include a collection of data stored as nodes and edges in a graph structure. In some implementations, a data structure includes a knowledge graph. In some implementations, a knowledge graph includes data organized in a graph containing nodes and edges. The data of a knowledge graph may include states about relationships between things and concepts, and those statements may be represented as nodes and edges of a graph. The nodes of a knowledge graph each contain a piece or pieces of data and the edges represent relationships between the data contained in the nodes that the edges connect. A particular implementation of a knowledge graph is described below in FIGS. 1-3.

In some implementations, data may be organized in a database using any one or more data structuring techniques. For example, data may be organized in a graph containing nodes connected by edges. In some implementations, the data may include statements about relationships between things and concepts, and those statements may be represented as nodes and edges of a graph. The nodes each contain a piece or pieces of data and the edges represent relationships between the data contained in the nodes that the edges connect. In some implementations, the graph includes one or more pairs of nodes connected by an edge. The edge, and thus the graph, may be directed such as unidirectional, undirected such as bidirectional, or both, such as one or more edges may be undirected and one or more edges may be directional in the same graph. Nodes may include any suitable data or data representation. Edges may describe any suitable relationships between the data. In some implementations, an edge is labeled or annotated, such that it includes both the connection between the nodes, and descriptive information about that connection. A particular node may be connected by distinct edges to one or more other nodes, or to itself, such that an extended graph is formed. For purposes of clarity, a graph based on the structure described immediately above is referred to herein as a knowledge graph. In some implementations, the knowledge graph may be a useful for representing information and in providing information in search.

Figure 1:
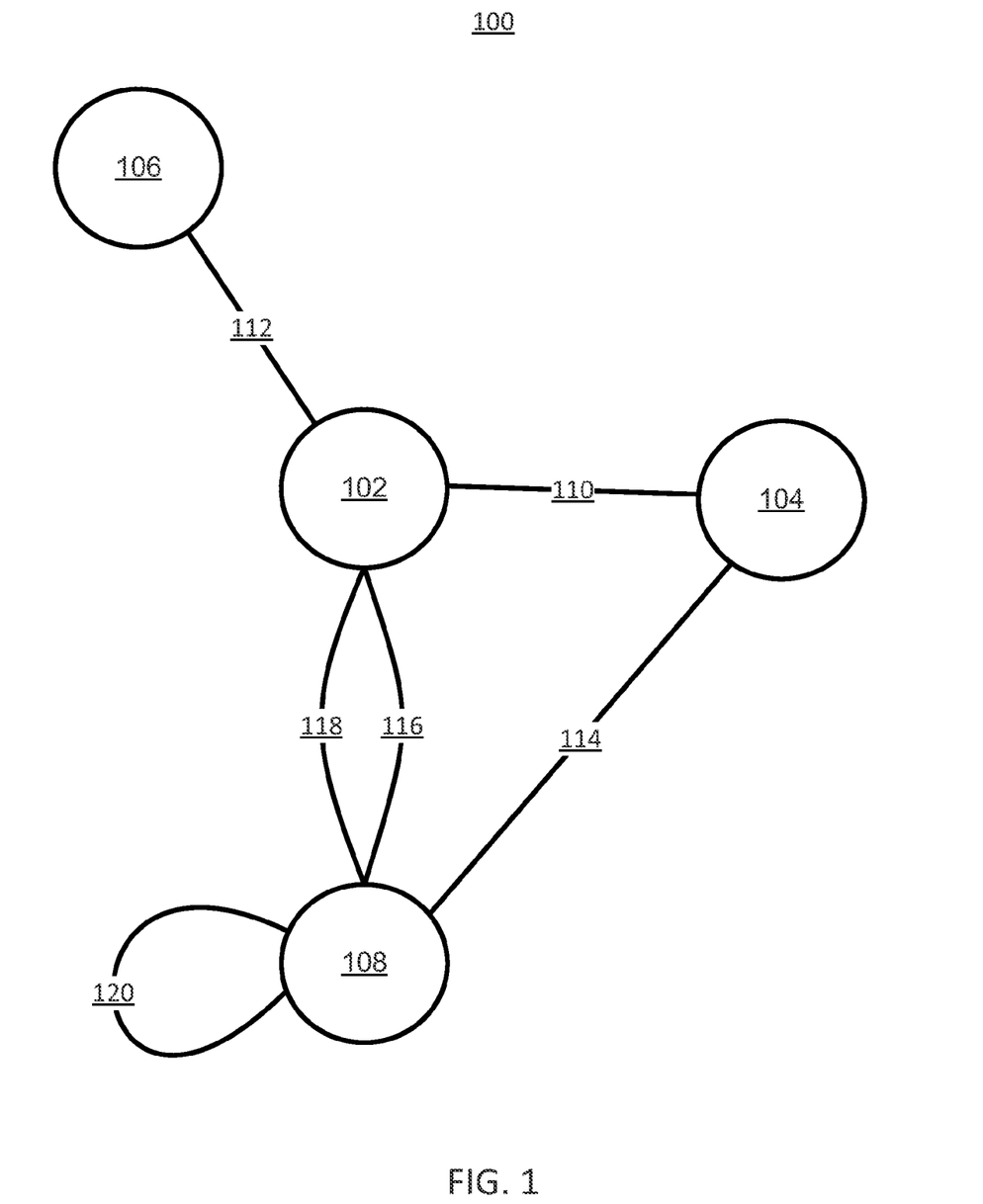
FIG. 1 shows an illustrative knowledge graph portion containing nodes and edges in accordance with some implementations of the present disclosure.

FIG. 1 shows illustrative knowledge graph portion 100 containing nodes and edges. Illustrative knowledge graph portion 100 includes nodes 102, 104, 106, and 108. Knowledge graph portion 100 includes edge 110 connecting node 102 and node 104. Knowledge graph portion 100 includes edge 112 connecting node 102 and node 106. Knowledge graph portion 100 includes edge 114 connecting node 104 and node 108. Knowledge graph portion 100 includes edge 116 and edge 118 connecting node 102 and node 108. Knowledge graph 100 includes edge 120 connecting node 108 to itself. Each aforementioned group of an edge and one or two distinct nodes may be referred to as a triple or 3-tuple. As illustrated, node 102 is directly connected by edges to three other nodes, while nodes 104 and 108 are directly connected by edges to two other nodes. Node 106 is connected by an edge to only one other node, and in some implementations, node 106 is referred to as a terminal node. As illustrated, nodes 102 and 108 are connected by two edges, indicating that the relationship between the nodes is defined by more than one property. As illustrated, node 108 is connected by edge 120 to itself, indicating that a node may relate to itself. While illustrative knowledge graph portion 100 contains edges that are not labeled as directional, it will be understood that each edge may be unidirectional or bidirectional. It will be understood that this example of a graph is merely an example and that any suitable size or arrangement of nodes and edges may be employed.

Generally, nodes in a knowledge graph can be grouped into several categories. Nodes may represent entities, organizational data such as entity types and properties, literal values, and models of relationships between other nodes.

In some implementations, entity types, properties, and other suitable content is created, defined, redefined, altered, or otherwise generated by any suitable technique. For example, content may be generated by manual user input, by automatic responses to user interactions, by importation of data from external sources, by any other suitable technique, or any combination thereof. For example, if a commonly searched for term is not represented in the knowledge graph, one or more nodes representing that node may be added. In another example, a user may manually add information and organizational structures.

Generally, nodes in a knowledge graph can be grouped into several categories. Nodes may represent entities, organizational data such as entity types and properties, literal values, and models of relationships between other nodes. A node of a knowledge graph may represent an entity. An entity is a thing or concept that is singular, unique, well-defined, and distinguishable. For example, an entity may be a person, place, item, idea, abstract concept, concrete element, other suitable thing, or any combination thereof. An entity generally refers to the concept of the entity. It will be understood that in some implementations, the knowledge graph contains an entity reference, and not the physical embodiment of the entity. For example, an entity may be the physical embodiment of George Washington, while an entity reference is an abstract concept that refers to George Washington. In another example, the entity "New York City" refers to the physical city, and the knowledge graph uses a concept of the physical city as represented by, for example, an element in a data structure, the name of the entity, any other suitable element, or any combination thereof. Where appropriate, based on context, it will be understood that the term entity as used herein may correspond to an entity reference, and the term entity reference as used herein may correspond to an entity.

A node representing organizational data may be included in a knowledge graph. These may be referred to herein as entity type nodes. As used herein, an entity type node may refer to a node in a knowledge graph, while an entity type may refer to the concept represented by an entity type node. An entity type may be a defining characteristic of an entity. For example, entity type node Y may be connected to an entity node X by an "Is A" edge or link, discussed further below, such that the graph represents the information "The Entity X Is Type Y." For example, the entity node "George Washington" may be connected to the entity type node "President." An entity node may be connected to multiple entity type nodes, for example, "George Washington" may also be connected to entity type node "Person" and to entity type node "Military Commander." In another example, the entity type node "City"

may be connected to entity nodes "New York City" and "San Francisco." In another example, the concept "Tall People," although incompletely defined, i.e., it does not necessarily include a definition of "tall", may exist as an entity type node. In some implementations, the presence of the entity type node "Tall People," and other entity type nodes, may be based on user interaction.

In some implementations, an entity type node may include or be connected to data about: a list of properties associated with that entity type node, the domain to which that entity type node belongs, descriptions, values, any other suitable information, or any combination thereof. A domain refers to a collection of related entity types. For example, the domain "Film" may include, for example, the entity types "Actor," "Director," "Filming Location," "Movie," any other suitable entity type, or any combination thereof. In some implementations, entities are associated with types in more than one domain. For example, the entity node "Benjamin Franklin" may be connected with the entity type node "Politician" in the domain "Government" as well as the entity type node "Inventor" in the domain "Business".

In some implementations, properties associated with entity nodes or entity type nodes may also be represented as nodes. For example, nodes representing the property "Population" or "Location" may be connected to the entity type node "City." The combination and/or arrangement of an entity type and its properties is referred to as a schema. In some implementations, schemas are stored in tables or other suitable data structures associated with an entity type node. In some implementations, the knowledge graph may be self-defining or bootstrapping, such that it includes particular nodes and edges that define the concept of nodes, edges, and the graph itself. For example, the knowledge graph may contain an entity node "Knowledge Graph" that is connected to property nodes that describe a knowledge graph's properties such as "Has Nodes" and "Has Edges."

Specific values, in some implementations referred to as literals, may be associated with a particular entity in a terminal node by an edge defining the relationship. Literals may refer to values and/or strings of information. For example, literals may include dates, names, and/or numbers. In an example, the entity node "San Francisco" may be connected to a terminal node containing the literal "815,000" by an edge annotated with the property "Has Population." In some implementations, terminal nodes may contain a reference or link to long text strings and other information stored in one or more documents external to the knowledge graph. In some implementations, literals are stored as nodes in the knowledge graph. In some implementations, literals are stored in the knowledge graph but are not assigned a unique identification reference as described below, and are not capable of being associated with multiple entities. In some implementations, literal type nodes may define a type of literal, for example "Date/Time," "Number," or "GPS Coordinates."

In some implementations, the grouping of an edge and two nodes is referred to as a triple. The triple represents the relationship between the nodes, or in some implementations, between the node and itself. In some implementations, higher order relationships are modeled, such as quaternary and n-ary relationships, where n is an integer greater than 2. In some implementations, information modeling the relationship is stored in a node, which may be referred to as a mediator node. In an example, the information "Person X Donates Artifact Y To Museum Z" is stored in a mediator node connected entity nodes to X, Y, and Z, where each edge identifies the role of each respective connected entity node.

In some implementations, the knowledge graph may include information for differentiation and disambiguation of terms and/or entities. As used herein, differentiation refers to the many-to-one situation where multiple names are associated with a single entity. As used herein, disambiguation refers to the one-to-many situation where the same name is associated with multiple entities. In some implementations, nodes may be assigned a unique identification reference. In some implementations, the unique identification reference may be an alphanumeric string, a name, a number, a binary code, any other suitable identifier, or any combination thereof. The unique identification reference may allow the system to assign unique references to nodes with the same or similar textual identifiers. In some implementations, the unique identifiers and other techniques are used in differentiation, disambiguation, or both.

In some implementations of differentiation, a node may be associated with multiple terms or differentiation aliases in which the terms are associated with the same entity. For example, the terms "George Washington," "Geo. Washington, "President Washington," and "President George Washington" may all be associated with a single entity, i.e., node, in the knowledge graph. This may provide differentiation and simplification in the knowledge graph.

In some implementations of disambiguation, multiple nodes with the same or similar names are defined by their unique identification references, by associated nodes in the knowledge graph, by any other suitable information, or any combination thereof. For example, there may be an entity node related to the city "Philadelphia," an entity node related to the movie "Philadelphia," and an entity node related to the cream cheese brand "Philadelphia." Each of these nodes may have a unique identification reference, stored for example as a number, for disambiguation within the knowledge graph. In some implementations, disambiguation in the knowledge graph is provided by the connections and relationships between multiple nodes. For example, the city "New York" may be disambiguated from the state "New York" because the city is connected to an entity type "City" and the state is connected to an entity type "State." It will be understood that more complex relationships may also define and disambiguate nodes. For example, a node may be defined by associated types, by other entities connected to it by particular properties, by its name, by any other suitable information, or any combination thereof. These connections may be useful in disambiguating, for example, the node "Georgia" that is connected to the node "United States" may be understood represent the U.S. State, while the node "Georgia" connected to the nodes "Asia" and "Eastern Europe" may be understood to represent the country in eastern Europe.

In some implementations, a node may include or connect to data defining one or more attributes. The attributes may define a particular characteristic of the node. The particular attributes of a node may depend on what the node represents. In some implementations, an entity node may include or connect to: a unique identification reference, a list of entity types associated with the node, a list of differentiation aliases for the node, data associated with the entity, a textual description of the entity, links to a textual description of the entity, other suitable information, or any combination thereof. As described above, nodes may contain a reference or link to long text strings and other information stored in one or more documents external to the knowledge graph. In some implementations, the storage technique may depend on the particular information. For example, a unique identification reference may be stored within the node, a short information string may be stored in a terminal node as a literal, and a long description of an entity may be stored in an external document linked to by a reference in the knowledge graph.

An edge in a knowledge graph may represent a semantic connection defining a relationship between two nodes. The edge may represent a prepositional statement such as "Is A," "Has A," "Is Of A Type," "Has Property," "Has Value," any other suitable statement, or any combination thereof. For example, the entity node of a particular person may be connected by a "Date Of Birth" edge to a terminal node containing a literal of his or her specific date of birth. In some implementations, the properties defined by edge connections of an entity may relate to nodes connected to the type of that entity. For example, the entity type node "Movie" may be connected to entity nodes "Actor" and "Director," and a particular movie may be connected by an edge property "Has Actor" to an entity node representing a particular actor.

In some implementations, nodes and edges define the relationship between an entity type node and its properties, thus defining a schema. For example, an edge may connect an entity type node to a node associated with a property, which may be referred to as a property node. Entities of the type may be connected to nodes defining particular values of those properties. For example, the entity type node "Person" may be connected to property node "Date of Birth" and a node "Height." Further, the node "Date of Birth" may be connected to the literal type node "Date/Time," indicating that literals associated with "Date of Birth" include date/time information. The entity node "George Washington," which is connected to entity type node "Person" by an "Is A" edge, may also be connected to a literal "Feb. 22, 1732" by the edge "Has Date Of Birth." In some implementations, the entity node "George Washington" is connected to a "Date Of Birth" property node. It will be understood that in some implementations, both schema and data are modeled and stored in a knowledge graph using the same technique. In this way, both schema and data can be accessed by the same search techniques. In some implementations, schemas are stored in a separate table, graph, list, other data structure, or any combination thereof. It will also be understood that properties may be modeled by nodes, edges, literals, any other suitable data, or any combination thereof.

For example, the entity node "George Washington" may be connected by an "Is A" edge to the entity type node representing "Person," thus indicating an entity type of the entity, and may also be connected to a literal "Feb. 22, 1732" by the edge "Has Date Of Birth," thus defining a property of the entity. In this way, the knowledge graph defines both entity types and properties associated with a particular entity by connecting to other nodes. In some implementations, "Feb. 22, 1732" may be a node, such that it is connected to other events occurring on that date. In some implementations, the date may be further connected to a year node, a month node, and a day of node. It will be understood that this information may be stored in any suitable combination of literals, nodes, terminal nodes, interconnected entities, any other suitable arrangement, or any combination thereof.

Figure 2:
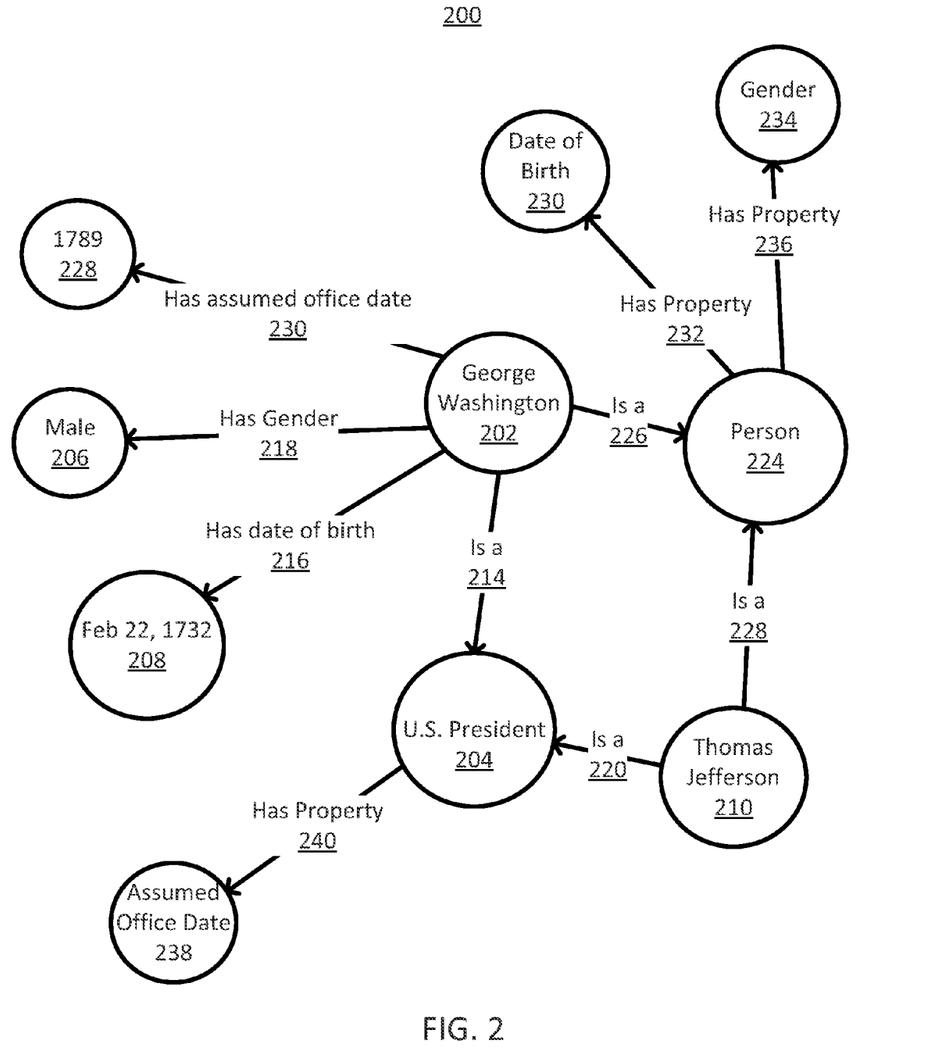
FIG. 2 shows an illustrative knowledge graph portion in accordance with some implementations of the present disclosure.

FIG. 2 shows an illustrative knowledge graph portion 200. Knowledge graph portion 200 includes information related to the entity "George Washington," represented by "George Washington" node 202. "George Washington" node 202 is connected to "U.S. President" entity type node 204 by "Is A" edge 214 with the semantic content "Is A," such that the 3-tuple defined by nodes 202 and 204 and the edge 214 contains the information "George Washington is a U.S. President." Similarly, the information "Thomas Jefferson Is A U.S. President" is represented by the tuple of "Thomas Jefferson" node 210, "Is A" edge 220, and "U.S. President" node 204.

Knowledge graph portion 200 includes entity type nodes "Person" 224, and "U.S. President" node 204. The person type is defined in part by the connections from "Person" node 224. For example, the type "Person" is defined as having the property "Date Of Birth" by node 230 and edge 232, and is defined as having the property "Gender" by node 234 and edge 236. These relationships define in part a schema associated with the entity type "Person."

"George Washington" node 202 is shown in knowledge graph portion 200 to be of the entity types "Person" and "U.S. President," and thus is connected to nodes containing values associated with those types. For example, "George Washington" node 202 is connected by "Has Gender" edge 218 to "Male" node 206, thus indicating that "George Washington has gender "Male." Further, "Male" node 206 may be connected to the "Gender" node 234 indicating that "Male Is A Type Of Gender." Similarly, "George Washington" node 202 is be connected by "Has Date of Birth" edge 216 to "Feb. 22, 1732" node 208, thus indicating that "George Washington Has Date Of Birth Feb. 22, 1732." "George Washington" node 202 may also be connected to "1789" node 228 by "Has Assumed Office Date" edge 230.

Knowledge graph portion 200 also includes "Thomas Jefferson" node 210, connected by "Is A" edge 220 to entity type "U.S. President" node 204 and by "Is A" edge 228 to "Person" entity type node 224. Thus, knowledge graph portion 200 indicates that "Thomas Jefferson" has the entity types "U.S. President" and "Person." In some implementations, "Thomas Jefferson" node 210 is connected to nodes not shown in FIG. 2 referencing his date of birth, gender, and assumed office date.

It will be understood that knowledge graph portion 200 is merely an example and that it may include nodes and edges not shown. For example, "U.S. President" node 204 may be connected to all of the U.S. Presidents. "U.S. President" node 204 may also be connected to properties related to the entity type such as a duration of term, for example "4 Years," a term limit, for example "2 Terms," a location of office, for example "Washington D.C.," any other suitable data, or any combination thereof. For example, "U.S. President" node 204 is connected to "Assumed Office Date" node 238 by "Has Property" edge 240, defining in part a schema for the type "U.S. President." Similarly, "Thomas Jefferson" node 210 may be connected to any suitable number of nodes containing further information related to his illustrated entity type nodes "U.S. President," and "Person," and to other entity type nodes not shown such as "Inventor," "Vice President," and "Author." In a further example, "Person" node 224 may be connected to all entities in the knowledge graph with the type "Person." In a further example, "1789" node 228 may be connected to all events in the knowledge graph with the property of year "1789." "1789" node 228 is unique to the year 1789, and disambiguated from, for example, a book entitled "1789," not shown in FIG. 2, by its unique identification reference. In some implementations, "1789" node 228 is connected to the entity type node "Year."

Figure 3:
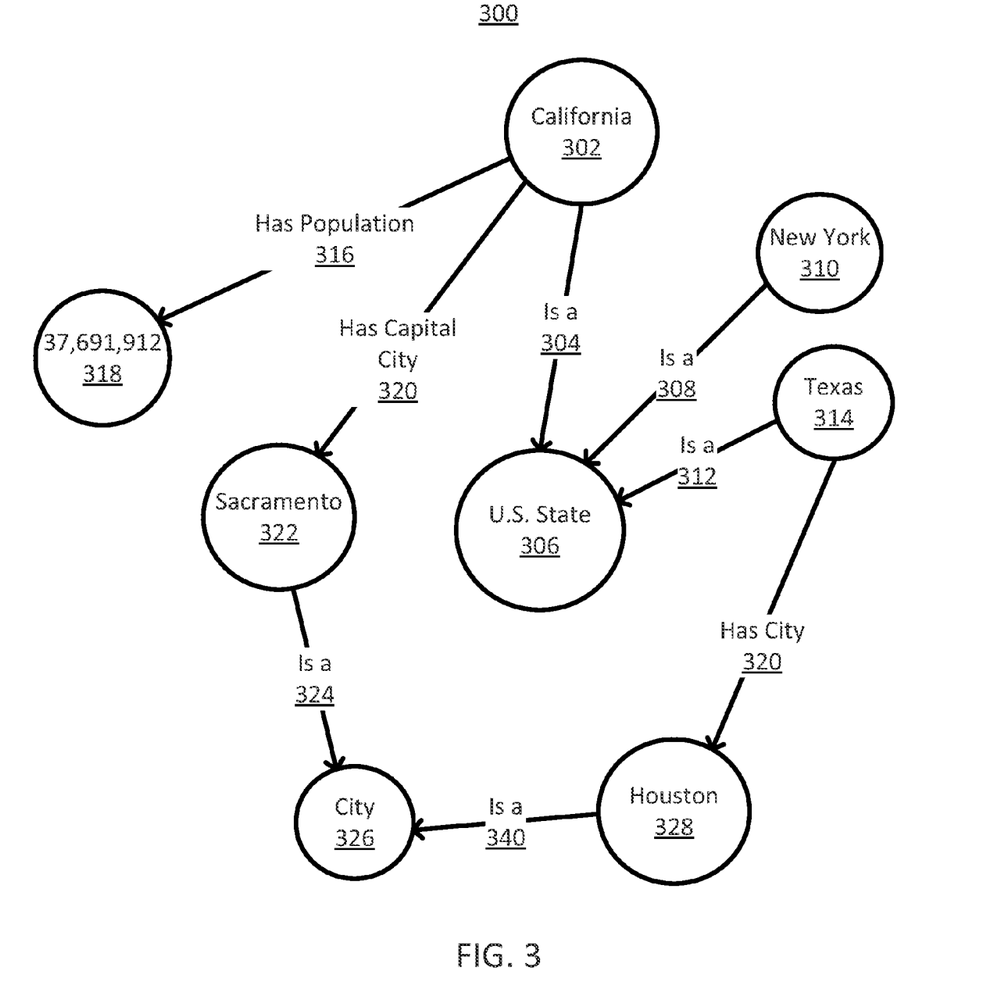
FIG. 3 shows another illustrative knowledge graph portion in accordance with some implementations of the present disclosure.

FIG. 3 shows another illustrative knowledge graph portion 300. Knowledge graph portion 300 includes "California" node 302, which may also be associated with differentiation aliases such as, for example, "CA," "Calif.," "Golden State," any other suitable differentiation aliases, or any combination thereof. In some implementations, these differentiations are stored in "California" node 302. California is connected by "Is A" edge 304 to the "U.S. State" entity type node 306. "New York" node 310 and "Texas" node 314 are also connected to "U.S. State" node 306 by "Is A" edges 308 and 312, respectively. "California" node 302 is connected by "Has Capital City" edge 320 to "Sacramento" node 322, indicating the information that "California Has Capital City Sacramento." Sacramento node 322 is further connected by "Is A" edge 324 to the "City" entity type node 326. Similarly, "Texas" node 314 is connected by "Has City" edge 320 to "Houston" node 328, which is further connected to the "City" entity type node 326 by "Is A" edge 340. "California" node 302 is connected by "Has Population" edge 316 to node 318 containing the literal value "37,691,912." In an example, the particular value "37,691,912" may be periodically automatically updated by the knowledge graph based on an external website or other source of data. Knowledge graph portion 300 may include other nodes not shown. For example, "U.S. State" entity type node 306 may be connected to nodes defining properties of that type such as "Population" and "Capital City." These type-property relationships may be used to define other relationships in knowledge graph portion 300 such as "Has Population" edge 316 connecting entity node "California" 316 with terminal node 318 containing the literal defining the population of California.

It will be understood that while knowledge graph portion 200 of FIG. 2 and knowledge graph portion 300 of FIG. 3 below show portions of a knowledge graph, all pieces of information may be contained within a single graph and that these selections illustrated herein are merely an example. In some implementations, separate knowledge graphs are maintained for different respective domains, for different respective entity types, or according to any other suitable delimiting characteristic. In some implementations, separate knowledge graphs are maintained according to size constraints. In some implementations, a single knowledge graph is maintained for all entities and entity types.

A knowledge graph may be implemented using any suitable software constructs. In an example, a knowledge graph is implemented using object oriented constructs in which each node is an object with associated functions and variables. Edges, in this context, may be objects having associated functions and variables. In some implementations, data contained in a knowledge graph, pointed to by nodes of a knowledge graph, or both, is stored in any suitable one or more data repositories across one or more servers located in one or more geographic locations coupled by any suitable network architecture.

Figure 4:
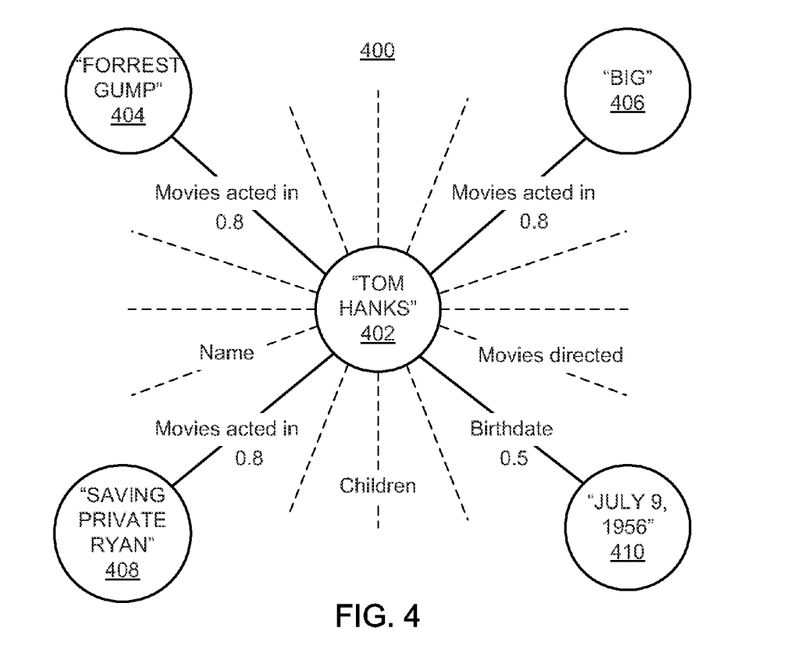
FIG. 4 is block diagram of an illustrative entity and related entities related to the entity by properties in a portion of a knowledge graph in accordance with some implementations of the present disclosure.

FIG. 4 is block diagram of an illustrative entity and related entities related to the entity by respective properties in knowledge graph portion 400 in accordance with some implementations of the present disclosure. Each pair of the entity and a related entity may have an associated related entity score indicating, for example, the popularity, relevance, instances of co-occurrence on one or more webpages, or a combination thereof, of the pair. The entity reference "Tom Hanks" 402 is related to entity references "Forrest Gump" 404, "Big" 406, "Saving Private Ryan" 408, and "Jul. 9, 1956" 410, by respective properties "Movies acted in" and "Birthdate," as shown in FIG. 4. The entity reference "Tom Hanks" 402 is also related to multiple other entity references, not shown in FIG. 4 although illustrative paths are indicated by dashed lines, by respective properties. Each related entity reference 404, 406, 408 and 410 has an associated related entity score, shown as a number just below the respective property in FIG. 4, with respect to entity reference "Tom Hanks" 402, which indicates the respective relatedness. For example, related entity references 404, 406, 408 and 410 have respective associated related entity scores of 0.8, 0.8, 0.8, and 0.5. Entity reference "Tom Hanks" 402 may be, for example, associated with the entity types "Person," "Actor," and "Director." The property "Movies acted in" may be, for example, associated with types "Person" and "Actor."

A technique to sort the properties associated with an entity may include determining a set of related entity scores between the entity and each respective related entity. In some implementations, properties are sorted in order of importance. Importance may be determined based on, for example, a related entity score that quantifies the relationship between an entity and each respective related entity. In some implementations, properties are sorted by associated entity types. For example, for a particular type, the properties associated with that type are sorted based on a property score, which may be determined based on related entity scores. The related entity score is based on, for example, the co-occurrence of the entity and respective related entity on the web, corresponding with a path in a knowledge graph. The path may be, for example, an edge connecting the entity and respective related entity, where the edge is associated with a property. For each property that relates the entity to a related entity, the related entity score associated with each of the respective related entities having that property are combined to generate a property score. For example, the related entity scores may be summed, or otherwise aggregated. The properties are sorted by the property score, e.g., for each entity type, to provide a ranked list of properties' importance for that type. Some entity types may have one or more subtypes, in which case the sum for common properties for each subtype, as well as for the entity type itself, are summed. For example, the entity type "Actor" may be a subtype of the entity type "Person," and all common properties may be respectively summed, or otherwise aggregated, for the entity type "Person." An output such as search results can be provided to a user, based on the sorted properties in response to, for example, a search query.

Figure 5:
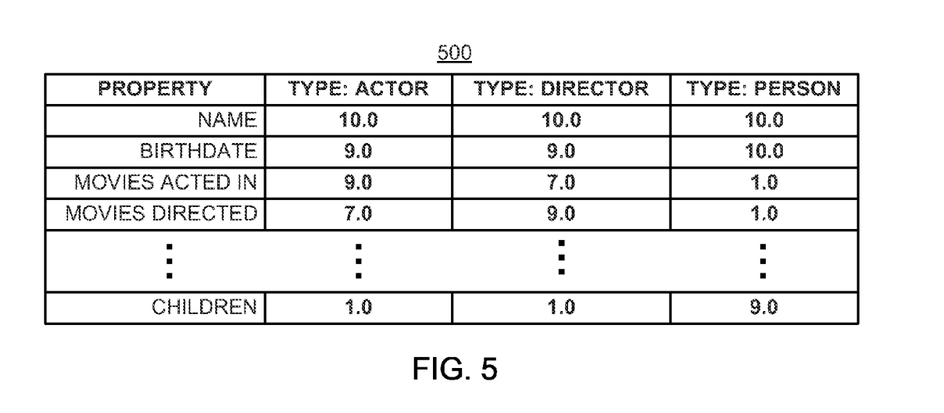
FIG. 5 is an illustrative table of property sums for multiple properties among multiple types of an entity in accordance with some implementations of the present disclosure.

FIG. 5 is an illustrative data structure 500 of property scores for multiple properties among multiple types associated with an entity reference in accordance with some implementations of the present disclosure. Table 500 may be generated based on, for example, related entity scores calculated for entity reference "Tom Hanks" 402 and related entity references 404, 406, 408 and 410 included in a knowledge graph (e.g., a knowledge graph containing knowledge graph portion 400 of FIG. 4). The property scores indicate the relative importance of each property within the corresponding entity type. For example, the property "Movies acted in" has a property score of 9.0 for the entity type "Actor," and a relatively smaller property score of 7.0 for the entity type "Director," indicating that this property is more important in the entity type "Actor." In a further example, for the entity types "Actor" and "Director," the property children may be relatively less important that for the type "Person." In some implementations, related entity scores, or property scores derived thereof, may be weighted differently depending on the entity type.

Figure 6:
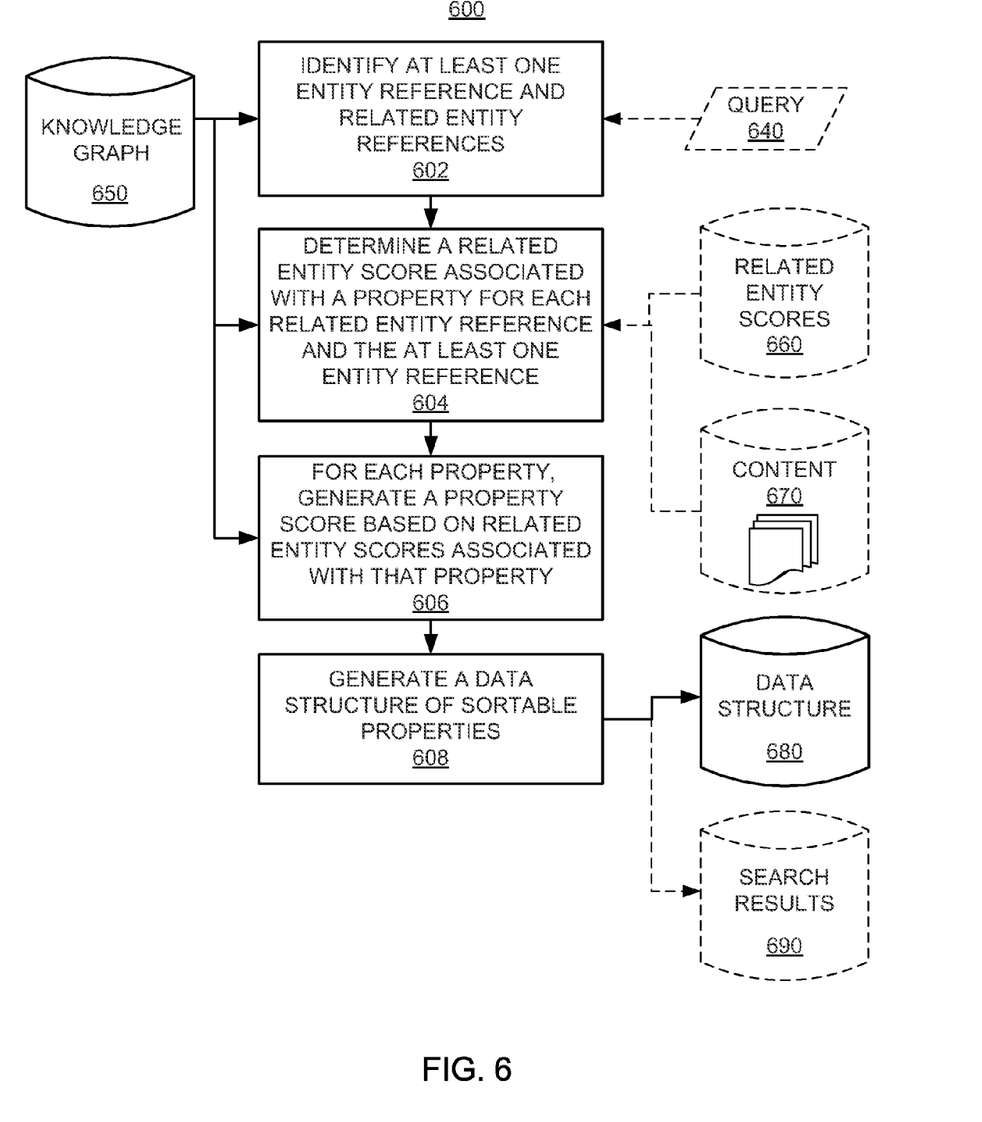
FIG. 6 is flow diagram of illustrative techniques for providing sorted search results in accordance with some implementations of the present disclosure.

FIG. 6 is flow diagram 600 of illustrative techniques for providing sorted search results. In some implementations, the illustrative steps of flow diagram 600 may be performed for one or more entity references and corresponding related entity references, and resulting property scores may be stored in a data structure for output in response to future queries. In some implementations, the illustrative steps of flow diagram 600 are performed in response to query 640. Query 640 may include a text query, a collection of filter settings, one or more menu selections, any other information for which search results may be provided, or any combination thereof.

Step 602 includes one or more processors identifying at least one entity reference and related entity references that are related to the entity by one or more respective properties. In some implementations, the at least one entity reference, the related entity references, and properties relating the at least one entity reference and related entity references may be included in knowledge graph 650. In some circumstances, the one or more processors identify the at least one entity reference based on query 640, which may include user inputted text, menu selections, filter settings, information from applications, any other suitable information, or any combination thereof. In some circumstances, the one or more processors identify the at least one entity reference independent of a query.

Step 604 includes one or more processors determining a related entity score associated with a property for each related entity reference and the at least one entity reference identified at step 602. In some implementations, the related entity scores may be stored in a data structure 660, which the one or more processors may access. In some implementations, the one or more processors retrieve the related entity scores from a pre-generated data structure, such as data structure 660. For example, the related entity scores may be stored in a table such as that illustrated in FIG. 5. In a further example, the related entity scores may be stored as part of knowledge graph 650. In some implementations, the one or more processors calculate the related entity scores. For example, the one or more processors may calculate the co-occurrence of the entity and each related entity among content 670, which may include webpages, indexes of webpages, web documents, data structures including information regarding an entity reference or property relating entity references, any other content, or any combination thereof. For example, the one or more processors may calculate the co-occurrence of the entity and each related entity among content 670, which may include webpages, indexes of webpages, web documents, data structures including information regarding an entity reference or property relating entity references, any other content, or any combination thereof. Whether the related entity scores are generated in response to a query, or pre-generated, they provide an indication of the relatedness between two entity references. The relatedness of an entity reference and a related entity reference is based on, for example, their co-occurrence in content 670, their co-occurrence in one or more queries, any other information indicative of their relatedness, or any combination thereof. An illustrative expression for determining co-occurrence COO(E,RE$_j$) is shown by Eq. 1:

$$COO(E, RE_j) = \frac{P(E, RE_j)}{P(E)} \quad (1)$$

in which P(E) is the probability of finding entity reference E in a text corpus, e.g., one or more webpages, and P(E,RE$_j$) is the probability of finding both the entity reference E and the related entity reference RE$_j$, indexed by index j, in the text corpus. Another illustrative expression for determining co-occurrence COO(E,RE$_j$) is shown by Eq. 2:

$$COO(E, RE_j) = \frac{N(E, RE_j)}{N(E) + N(RE_j) - N(E, RE_j)} \quad (2)$$

in which N(E) is the number of instances of entity reference E in a text corpus, N(RE$_j$) is the number of instances of related entity reference RE$_j$ in the text corpus, and N(E,RE$_j$) is the number of instances of both the entity reference E and the related entity reference RE$_j$ the text corpus. In some implementations, the one or more processors may normalize, scale, shift, or otherwise alter the co-occurrence value to convert them into related entity scores. Any suitable technique, including any suitable equation or formula, may be used to determine a co-occurrence value, a related entity score, or a combination thereof.

Step 606 includes one or more processors generating a property score for each property based on the related entity scores associated with the property. Related entity scores associated with each particular property may be combined for that property. For example, referencing FIG. 4, the related entity scores for related entities "Forrest Gump," "Big," and "Saving Private Ryan" may be summed to give a sum for the property "Movies acted in," e.g., 0.8+0.8+0.8=2.4. In a further example, the related entity scores may be combined as a weighted sum. Any suitable combination of related entity scores may be used to generate the property score. In some implementations, one or more types may be a subtype of another entity type. For example, referencing data structure 550 of FIG. 5, the type "Actor" may be a subtype of the entity type "Person," which may be referred to as a parent type relative to the subtype. In some such implementations, for the parent type, the property score for each property of each subtype may be summed with the same property of the parent type. For example, referencing data structure 550 of FIG. 5, property "Movies acted in" is included in type "Actor" and "Person," and accordingly, the property score of 9.0 for the entity type "Actor" may be aggregated to the property score 1.0 for the entity type "Person." The one or more processors may renormalize, scale, weight, or otherwise alter the scores within the parent type after incorporating the subtype.

Step 608 includes one or more processors generating a data structure 680 of sortable properties scores based on the property scores of step 606. A sortable property is a property that may be sorted with respect to other properties. The properties may be, for example, sorted in ascending or descending order based on the respective property scores. In some implementations, properties associated with an entity type are sorted for that entity type based on the respective property scores. Some examples of properties and associated entity types are provided above in the discussion of FIGS. 1-4. For example, the type "Actor" may be associated with the properties "Movies acted in," "Awards won," "Birthdate," and "Television shows acted in." These four properties may be sorted by their respective property scores, within the type "Actor." These same four properties may also be sorted within any other entity type that is associated with properties by a defined schema. In some implementations, if an entity reference is associated with multiple entity types, the one or more processors may select the type that is mentioned in a query, the most popular type, all types, any other type associated with the entity reference, or any combination thereof. In some implementations, for one or more entity types, the one or more processors generate an important property list sorted by their determined importance in descending order. For example, referencing data structure 500 of FIG. 5, the one or more processors may sort the properties for types "Actor," "Director," and "Person" based on the property scores shown. As an example, for the entity type "Actor" the properties "Name," "Birthdate," "Movies acted in," "Movies directed," and any other properties associated with the entity type "Actor" in descending order by property score.

In some implementations, step 608 includes one or more processors providing output based on the sorted properties from step 308. In some implementations, the one or more processors provide search results 690, which may include a sorted collection of information regarding the entity. For example, the one or more processors may identify a collection of information regarding the at least one entity reference of step 602, and sort the collection of information based on property scores. In some implementations, the one or more processors determine a desired type from query 650, and display information in the order corresponding to the sorted properties. For example, query 650 can be "Tom Hanks," and at step 602 the one or more processors may determine that the desired type is "Actor," and accordingly, search results 690 may include a sorted collection of properties associated with the type "Actor." Search results 690 may include relevant information, links to webpages containing relevant information, links to other references containing relevant information, any other suitable output, or any combination thereof. In some implementations, the one or more processors may be configured to display search results 690 on a display screen.

In an illustrative example, one or more processors may identify properties at step 604, based on all entity types associated with an entity reference identified at step 602. To determine the relative importance of the identified properties associated with each respective entity type, the one or more processors may use related entity scores associated with the related entity references and the entity reference. The one or more processors may assign each related entity score to a property $P_j$. The one or more processors may find all entity types $T_1, T_2, \ldots,$ and $T_N$ associated with the entity reference. If entity type $T_1$ is associated with property $P_j$, the one or more processors may combine the related entity score with other related entity scores associated with property P; for entity type $T_1$, to generate a property score at step 606. The one or more processors may add up all related entity scores using the above technique, and sort all properties within every type to generate an important property list for each entity type at step 608.

Figure 7:
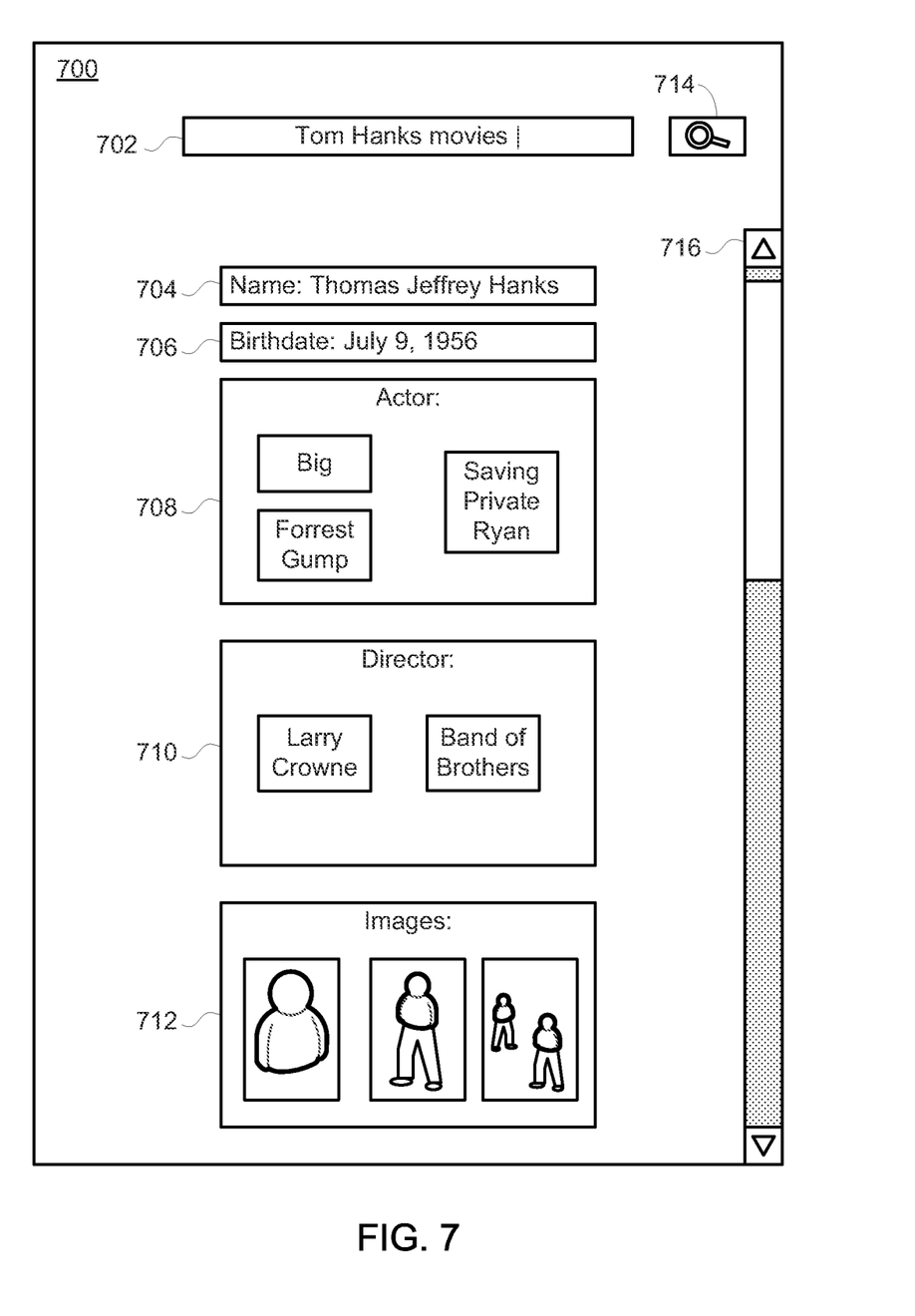
FIG. 7 shows a screenshot of an illustrative display showing sorted search results in accordance with some implementations of the present disclosure.

In a further illustrative example of the techniques of flow diagram 600 of FIG. 6, FIG. 7 shows a screenshot of an illustrative display 700 showing sorted search results in accordance with the present disclosure. Query 702 includes the text "Tom Hanks Movies," which may be inputted by a user. In response to a user selection of search icon 714, one or more processors may receive query 702, and identify entity reference "Tom Hanks" and entity type "Actor" based on keyword "movies." For entity type "Actor," the one or more processors may retrieve a sorted list of properties, in sorted ascending order, including "Name," "Birthdate," "Movies acted in," "Programs directed by," "Images of," and any other suitable properties. Display 700 may include scrollbar 716, for example, to allow a user to scroll additional properties that are presented but are not shown in the screenshot. Search result 704 includes a presentation of related entity reference "Thomas Jeffrey Hanks" associated with the property "Name." Search result 706 includes a presentation of related entity reference "Jul. 9, 1956" associated with the property "Birthdate." Search result 708 includes a presentation of related entity references "Big," "Forrest Gump," and "Saving Private Ryan" associated with the property "Movies acted in." Search result 710 includes a presentation of related entity references "Larry Crowne," and "Band of Brothers" associated with the property "Programs directed by." Search result 712 includes a presentation of related entity references that are images associated with the property "Images of." Any suitable presentation technique may be used, such as, for example, graphical presentation, audio presentation, data structure presentation such as a stored file, or a combination thereof, in accordance with the present disclosure. Accordingly, any suitable presentation style may be used to present search results based on property scores for an entity reference.

Figure 8:
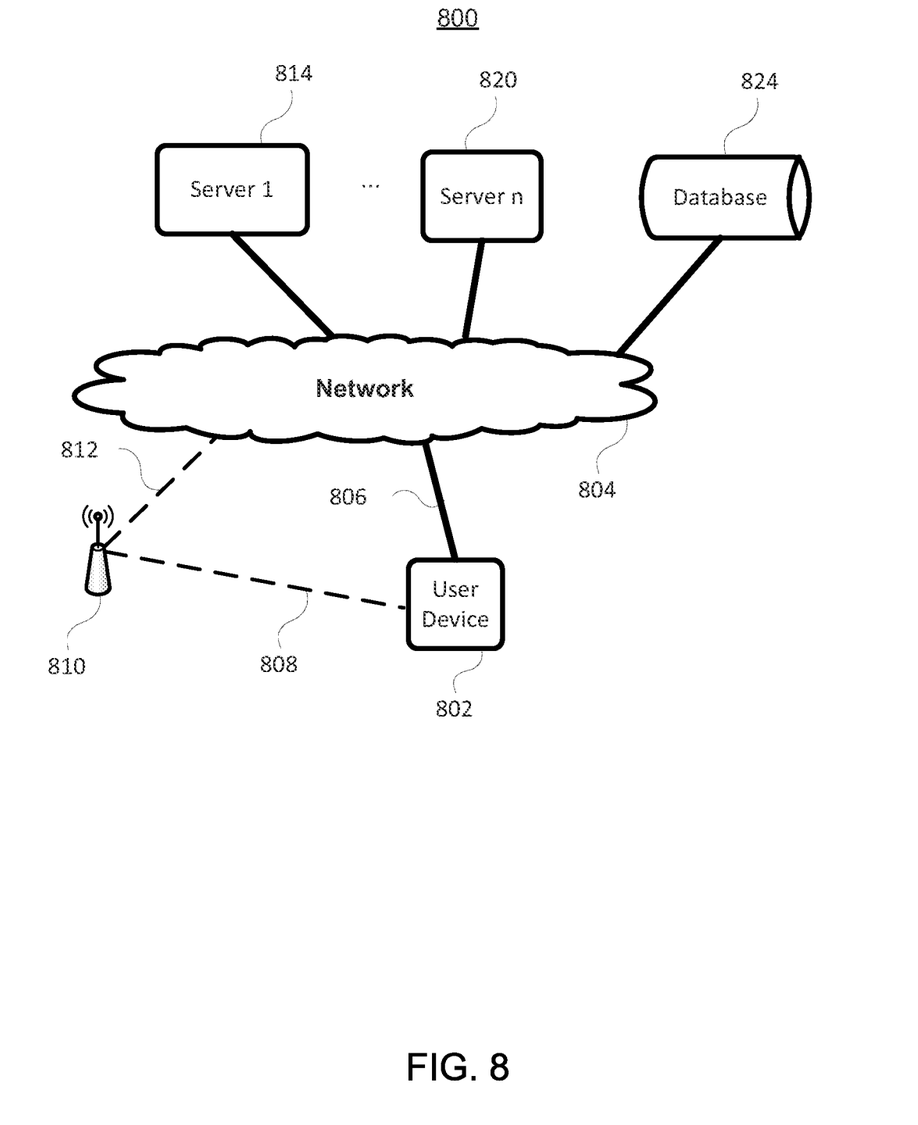
FIG. 8 shows an illustrative computer system in accordance with some implementations of the present disclosure.
Figure 9:
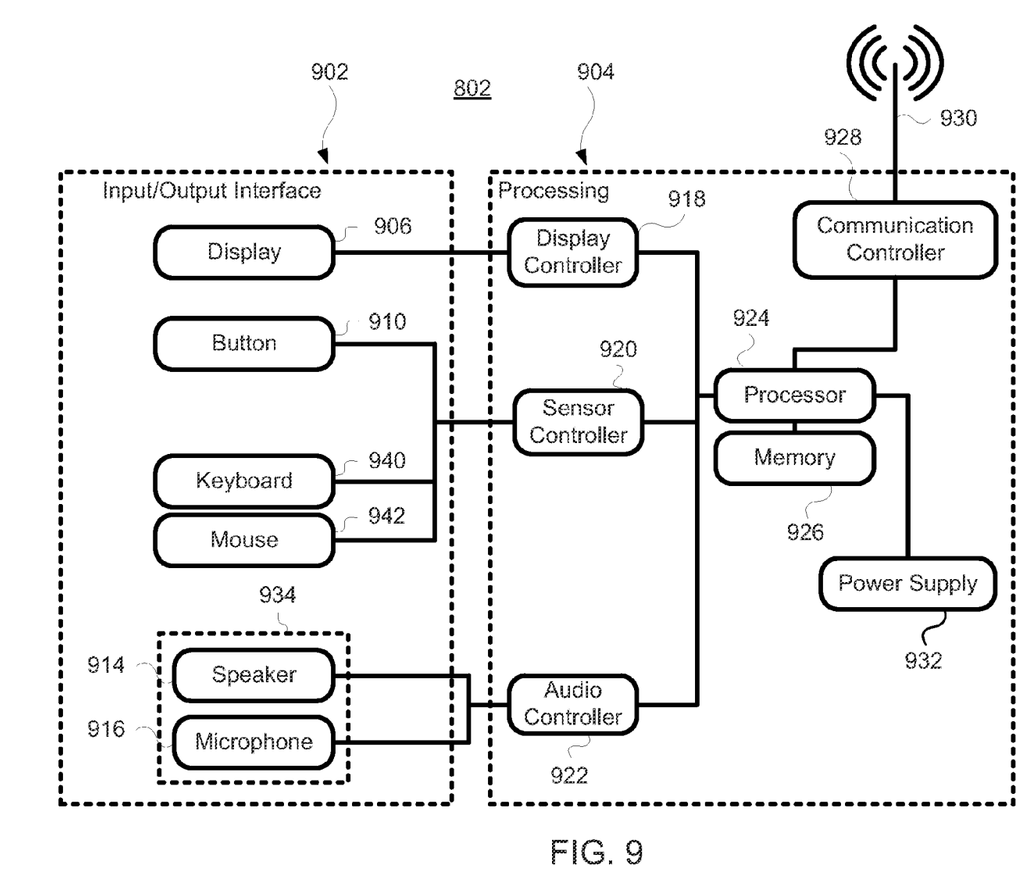
FIG. 9 is a block diagram of a client device of the illustrative computer system of FIG. 8 in accordance with some implementations of the present disclosure.

The following FIGS. 8-9 describe illustrative computer systems that may be used in some implementations of the present disclosure. It will be understood that the disclosed techniques may be implemented using any suitable computer or combination of computers.

FIG. 8 shows an illustrative computer system in accordance with some implementations of the present disclosure. System 800 may include one or more client device 802. In some implementations, client device 802 may include a smartphone, tablet computer, desktop computer, laptop computer, personal digital assistant (PDA), portable audio player, portable video player, mobile gaming device, other suitable client device capable of providing content, or any combination thereof.

Client device 802 may be coupled to network 804 directly through connection 806, through wireless repeater 810, by any other suitable way of coupling to network 804, or by any combination thereof. Network 804 may include the Internet, a dispersed network of computers and servers, a local network, a public intranet, a private intranet, other coupled computing systems, or any combination thereof.

Client device 802 may be coupled to network 804 by wired connection 806. Connection 806 may include Ethernet hardware, coaxial cable hardware, DSL hardware, T-1 hardware, fiber optic hardware, analog phone line hardware, any other suitable wired hardware capable of communicating, or any combination thereof. Connection 806 may include transmission techniques including TCP/IP transmission techniques, IEEE 802 transmission techniques, Ethernet transmission techniques, DSL transmission techniques, fiber optic transmission techniques, ITU-T transmission techniques, any other suitable transmission techniques, or any combination thereof.

Client device 802 may be wirelessly coupled to network 804 via wireless connection 808. In some implementations, wireless repeater 810 receives transmitted information from client device 802 by wireless connection 808 and communicates it with network 804 via connection 812. Wireless repeater 810 receives information from network 804 by connection 812 and communicates it with client device 802 by wireless connection 808. In some implementations, wireless connection 808 may include cellular phone transmission techniques, code division multiple access (CDMA) transmission techniques, global system for mobile communications (GSM) transmission techniques, general packet radio service (GPRS) transmission techniques, satellite transmission techniques, infrared transmission techniques, Bluetooth transmission techniques, Wi-Fi transmission techniques, WiMax transmission techniques, any other suitable transmission techniques, or any combination thereof.

Connection 812 may include Ethernet hardware, coaxial cable hardware, DSL hardware, T-1 hardware, fiber optic hardware, analog phone line hardware, wireless hardware, any other suitable hardware capable of communicating, or any combination thereof. Connection 812 may include wired transmission techniques including TCP/IP transmission techniques, IEEE 802 transmission techniques, Ethernet transmission techniques, DSL transmission techniques, fiber optic transmission techniques, ITU-T transmission techniques, any other suitable transmission techniques, or any combination thereof. Connection 812 may include may include wireless transmission techniques including cellular phone transmission techniques, code division multiple access (CDMA) transmission techniques, global system for mobile communications (GSM) transmission techniques, general packet radio service (GPRS) transmission techniques, satellite transmission techniques, infrared transmission techniques, Bluetooth transmission techniques, Wi-Fi transmission techniques, WiMax transmission techniques, any other suitable transmission techniques, or any combination thereof.

Wireless repeater 810 may include any number of cellular phone transceivers, network routers, network switches, communication satellites, other devices for communicating information from client device 802 to network 804, or any combination thereof. It will be understood that the arrangement of connection 806, wireless connection 808 and connection 812 is merely illustrative and that system 800 may include any suitable number of any suitable devices coupling client device 802 to network 804. It will also be understood that any client device 802, may be communicatively coupled with any client device, remote server, local server, any other suitable processing equipment, or any combination thereof, and may be coupled using any suitable technique as described above.

In some implementations, any suitable number of remote servers 814 and 820 may be coupled to network 804. Remote servers may be general-purpose, specific, or any combination thereof. One or more database servers 824 may be coupled to network 804. It will be understood that the system may use any suitable number of general purpose, specific purpose, storage, processing, search, any other suitable server, or any combination.

FIG. 9 is a block diagram of a client device of the illustrative computer system of FIG. 8 in accordance with some implementations of the present disclosure. Client device 802 may include interface equipment 902 (e.g., input/output equipment) and processing equipment 904. Interface equipment 902 may include display 906, button 910, keyboard 940, mouse 942, and audio equipment 934 including speaker 914 and microphone 916. In some implementations, the equipment illustrated in FIG. 9 may be representative of equipment included in a smartphone client device. It will be understood that the specific equipment included in the illustrative computer system may depend on the type of client device. It will be understood that client device 802 may omit any suitable illustrated elements, and may include equipment not shown such as media drives, data storage, communication devices, display devices, processing equipment, any other suitable equipment, or any combination thereof.

In some implementations, display 906 may include a liquid crystal display, light emitting diode display, organic light emitting diode display, amorphous organic light emitting diode display, plasma display, cathode ray tube display, projector display, any other suitable type of display capable of displaying content, or any combination thereof. Display 906 may be controlled by display controller 918 or by processor 924 in processing equipment 904, by processing equipment internal to display 906, by other controlling equipment, or by any combination thereof. For example, display 906 may be configured to display one or more webpages, having associated DOM trees.

Button 910 may be one or more electromechanical pushbutton mechanism, slide mechanism, switch mechanism, rocker mechanism, toggle mechanism, other suitable mechanism, or any combination thereof. Button 910 may be included in a touchscreen as a predefined region of the touchscreen (e.g., soft keys). Activation of button 910 may send a signal to sensor controller 920, processor 924, display controller 920, any other suitable processing equipment, or any combination thereof. Activation of button 910 may include receiving from the user a pushing gesture, sliding gesture, touching gesture, pressing gesture, time-based gesture based on the duration of a push for example, any other suitable gesture, or any combination thereof. For example a user gesture may be received by button 910, indicating that a displayed collection is to be changed.

Audio equipment 934 may include sensors and processing equipment for receiving and transmitting information using acoustic or pressure waves. Speaker 914 may include equipment to produce acoustic waves in response to a signal. In some implementations, speaker 914 may include an electroacoustic transducer wherein an electromagnet is coupled to a diaphragm to produce acoustic waves in response to an electrical signal. Microphone 916 may include electroacoustic equipment to convert acoustic signals into electrical signals. In some implementations, a condenser-type microphone may use a diaphragm as a portion of a capacitor such that acoustic waves induce a capacitance change in the device, which may be used as an input signal by client device 802.

Speaker 914 and microphone 916 may be contained within client device 802, may be remote devices coupled to client device 802 by any suitable wired or wireless connection, or any combination thereof.

Speaker 914 and microphone 916 of audio equipment 834 may be coupled to audio controller 922 in processing equipment 904. This controller may send and receive signals from audio equipment 934 and perform pre-processing and filtering steps before transmitting signals related to the input signals to processor 924. Speaker 914 and microphone 916 may be coupled directly to processor 924. Connections from audio equipment 934 to processing equipment 904 may be wired, wireless, other suitable arrangements for communicating information, or any combination thereof.

Processing equipment 904 of client device 802 may include display controller 918, sensor controller 920, audio controller 922, processor 924, memory 926, communication controller 928, and power supply 932.

Processor 924 may include circuitry to interpret signals input to client device 802 from, for example, microphone 916. Processor 924 may include circuitry to control the output to display 906 and speaker 914. Processor 924 may include circuitry to execute instructions of a computer program. In some implementations, processor 924 may be an integrated electronic circuit based, capable of executing the instructions of a computer program and include a plurality of inputs and outputs.

Processor 924 may be coupled to memory 926. Memory 926 may include random access memory (RAM), flash memory, programmable read only memory (PROM), erasable programmable read only memory (EPROM), magnetic hard disk drives, magnetic tape cassettes, magnetic floppy disks optical CD-ROM discs, CD-R discs, CD-RW discs, DVD discs, DVD+R discs, DVD-R discs, any other suitable storage medium, or any combination thereof.

The functions of display controller 918, sensor controller 920, and audio controller 922, as have been described above, may be fully or partially implemented as discrete components in client device 802, fully or partially integrated into processor 924, combined in part or in full into combined control units, or any combination thereof.

Communication interface 928 may be coupled to processor 924 of client device 802. In some implementations, communication controller 928 may communicate radio frequency signals using antenna 930. In some implementations, communication controller 928 may communicate signals using a wired connection (not shown). Wired and wireless communications communicated by communication interface 928 may use Ethernet, amplitude modulation, frequency modulation, bitstream, code division multiple access (CDMA), global system for mobile communications (GSM), general packet radio service (GPRS), satellite, infrared, Bluetooth, Wi-Fi, WiMax, any other suitable communication configuration, or any combination thereof. The functions of communication controller 928 may be fully or partially implemented as a discrete component in client device 802, may be fully or partially included in processor 924, or any combination thereof.

Power supply 932 may be coupled to processor 924 and to other components of client device 802. Power supply 932 may include a lithium-polymer battery, lithium-ion battery, NiMH battery, alkaline battery, lead-acid battery, fuel cell, solar panel, thermoelectric generator, any other suitable power source, or any combination thereof. Power supply 932 may include a hard wired connection to an electrical power source, and may include electrical equipment to convert the voltage, frequency, and phase of the electrical power source input to suitable power for client device 802. In some implementations of power supply 932, a wall outlet may provide 120 volts, 60 Hz alternating current (AC). A circuit of transformers, resistors, inductors, capacitors, transistors, and other suitable electronic components included in power supply 932 may convert the 120V AC from a wall outlet power to 5 volts at 0 Hz, i.e., direct current. In some implementations of power supply 932, a lithium-ion battery including a lithium metal oxide-based cathode and graphite-based anode may supply 3.7V to the components of client device 802. Power supply 932 may be fully or partially integrated into client device 802, or may function as a stand-alone device. Power supply 932 may power client device 802 directly, may power client device 802 by charging a battery, may provide power by any other suitable way, or any combination thereof.

The foregoing is merely illustrative of the principles of this disclosure and various modifications may be made by those skilled in the art without departing from the scope of this disclosure. The above described implementations are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A computer-implemented method comprising:
   identifying in a knowledge graph, using at least one processor, at least one entity reference and related entity references related to the at least one entity reference by respective properties, wherein each of the respective properties reflects a relationship between the at least one entity reference and the respective related entity references;
   for each respective one of the related entity references, determining, using at least one processor, a related entity score associated with a respective property that relates the at least one entity reference and the respective one of the related entity references;
   for each respective property, generating a property score, using at least one processor, based on a sum of two or more related entity scores associated with that respective property; and
   generating, using at least one processor, and causing to be stored a data structure of sortable properties based on the generated property scores, wherein the data structure is usable to provide sorted search results in response to a query.

2. The method of claim 1, further comprising:
   identifying, using at least one processor, at least one entity type in a knowledge graph associated with the at least one entity reference, wherein the property score for each respective property is based on at least one of the at least one entity type, wherein the data structure is associated with the respective entity type.

3. The method of claim 2, wherein the at least one entity type comprises a first entity type and a second entity type, and wherein the second entity type is a subtype of the first entity type sharing at least one property with the first entity type, and wherein generating a property score comprises aggregating, using at least one processor, the property scores for each property associated with the first entity type and the second entity type to generate an aggregated property score.

4. The method of claim 1, wherein the related entity scores are based on a co-occurrence of the at least one entity reference and respective related entity references in content, wherein the co-occurrence is correlated with a property included in the knowledge graph.

5. The method of claim 1, further comprising:
   retrieving the data structure of sortable properties; and
   causing to be presented, using at least one processor, a collection of information based on the retrieved data structure.

6. The method of claim 5, wherein causing to be presented search results comprises:
   sorting, using at least one processor, the collection of information based on the property scores; and
   causing to be presented the sorted collection of information.

7. The method of claim 1, further comprising receiving a query, wherein identifying in the knowledge graph the at least one entity reference is based on the query.

8. A system comprising:
   a data structure comprising a knowledge graph; and
   one or more processors configured to perform operations comprising:
   identifying in the knowledge graph at least one entity reference and related entity references related to the at least one entity reference by respective properties, wherein each of the respective properties reflects a relationship between the at least one entity reference and the respective related entity references;
   for each respective one of the related entity references, determining a related entity score associated with a respective property that relates the at least one entity reference and the respective one of the related entity references;
   for each respective property, generating a property score based on a sum of two or more related entity scores associated with that respective property; and
   generating and causing to be stored a data structure of sortable properties based on the generated property scores, wherein the data structure is usable to provide sorted search results in response to a query.

9. The system of claim 8, wherein the one or more processors are further configured to perform operations comprising:
   identifying at least one entity type in a knowledge graph associated with the at least one entity reference, wherein the property score for each respective property is based on at least one of the at least one entity type, wherein the data structure is associated with the respective entity type.

10. The system of claim 9, wherein the at least one entity type comprises a first entity type and a second entity type, and wherein the second entity type is a subtype of the first entity type sharing at least one property with the first entity type, and wherein the one or more processors are further configured to perform generating a property score by performing operations comprising aggregating the property scores for each property associated with the first entity type and the second entity type to generate an aggregated property score.

11. The system of claim 8, wherein the related entity scores are based on a co-occurrence of the each entity reference and respective related entity reference in content, wherein the co-occurrence is correlated with a property included in the knowledge graph.

12. The system of claim 8, wherein the one or more processors are further configured to perform operations comprising:
  retrieving the data structure of sortable properties; and
  causing to be presented, using at least one processor, a collection of information based on the retrieved data structure.

13. The system of claim 12, wherein the one or more processors are further configured to perform operations comprising:
  sorting the collection of information based on the property scores; and
  causing to be presented the sorted collection of information.

14. The system of claim 8, wherein the one or more processors are further configured to perform operations comprising receiving a query, wherein identifying in the knowledge graph the at least one entity reference is based on the query.

15. A non-transitory computer-readable medium for using in providing search results, the computer-readable medium having computer program instructions recorded thereon for:
  identifying in a knowledge graph, using at least one processor, at least one entity reference and related entity references related to the at least one entity reference by respective properties, wherein each of the respective properties reflects a relationship between the at least one entity reference and the respective related entity references;
  for each respective one of the related entity references, determining, using at least one processor, a related entity score associated with a respective property that relates the at least one entity reference and the respective one of the related entity references;
  for each respective property, generating a property score, using at least one processor, based on a sum of two or more related entity scores associated with that respective property; and
  generating, using at least one processor, and causing to be stored a data structure of sortable properties based on the generated property scores, wherein the data structure is usable to provide sorted search results in response to a query.

16. The non-transitory computer-readable medium of claim 15, the computer-readable medium having further instructions for:
  identifying, using at least one processor, at least one entity type in a knowledge graph associated with the at least one entity reference, wherein the property score for each respective property is based on at least one of the at least one entity type, wherein the data structure is associated with the respective entity type.

17. The non-transitory computer-readable medium of claim 16, wherein the at least one entity type comprises a first entity type and a second entity type, and wherein the second entity type is a subtype of the first entity type sharing at least one property with the first entity type, and wherein generating a property score comprises aggregating, using at least one processor, the property scores for each property associated with the first entity type and the second entity type to generate an aggregated property score.

18. The non-transitory computer-readable medium of claim 15, wherein the related entity scores are based on a co-occurrence of the at least one entity reference and respective related entity references in content, wherein the co-occurrence is correlated with a property included in the knowledge graph.

19. The non-transitory computer-readable medium of claim 15, the computer-readable medium having further instructions for:
  retrieving the data structure of sortable properties; and
  causing to be presented, using at least one processor, a collection of information based on the retrieved data structure.

20. The non-transitory computer-readable medium of claim 19, the computer-readable medium having further instructions for:
  sorting, using at least one processor, the collection of information based on the property scores; and
  causing to be presented the sorted collection of information.

21. The non-transitory computer-readable medium of claim 15, the computer-readable medium having further instructions for receiving a query, wherein identifying in the knowledge graph the at least one entity reference is based on the query.

* * * * *